United States Patent
Soudier et al.

(10) Patent No.: US 12,534,407 B2
(45) Date of Patent: Jan. 27, 2026

(54) METHOD FOR THE CONTROL OF VOLUME EXPANSION OF HYDRAULICALLY SETTING COMPOSITIONS COMPRISING STEEL MAKING SLAG

(71) Applicant: SIKA TECHNOLOGY AG, Baar (CH)

(72) Inventors: Jerome Soudier, Vaux en Bugey (FR); Alexandre Ben Harrath, Bourgoin Jallieu (FR)

(73) Assignee: SIKA TECHNOLOGY AG, Baar (CH)

( * ) Notice: Subject to any disclaimer, the term of this patent is extended or adjusted under 35 U.S.C. 154(b) by 709 days.

(21) Appl. No.: 17/911,117

(22) PCT Filed: Mar. 18, 2021

(86) PCT No.: PCT/EP2021/056978
§ 371 (c)(1),
(2) Date: Sep. 12, 2022

(87) PCT Pub. No.: WO2021/197866
PCT Pub. Date: Oct. 7, 2021

(65) Prior Publication Data
US 2023/0122629 A1  Apr. 20, 2023

(30) Foreign Application Priority Data

Apr. 2, 2020  (EP) .................... 20315101

(51) Int. Cl.
| | | |
|---|---|---|
| *C04B 28/08* | (2006.01) | |
| *C04B 7/21* | (2006.01) | |
| *C04B 18/14* | (2006.01) | |
| *C04B 22/14* | (2006.01) | |
| *C04B 28/18* | (2006.01) | |
| *C04B 28/26* | (2006.01) | |
| *C04B 111/00* | (2006.01) | |

(52) U.S. Cl.
CPC .............. *C04B 28/082* (2013.01); *C04B 7/21* (2013.01); *C04B 18/141* (2013.01); *C04B 22/143* (2013.01); *C04B 28/18* (2013.01); *C04B 28/26* (2013.01); *C04B 2111/00146* (2013.01)

(58) Field of Classification Search
CPC ....... C04B 28/082; C04B 7/21; C04B 18/141; C04B 22/143; C04B 28/18; C04B 28/26; C04B 2111/00146; C04B 2103/0042; C04B 2111/00637; C04B 2111/00646; C04B 2111/00663; C04B 2111/00715; C04B 2111/27; C04B 2111/34; C04B 2111/60; C04B 2111/62; C04B 2111/70; C04B 2111/72; C04B 28/16; C04B 28/145; C04B 28/08; Y02W 30/91
See application file for complete search history.

(56) References Cited

FOREIGN PATENT DOCUMENTS

| CN | 105073680 A | 11/2015 |
|---|---|---|
| CN | 106587796 A | 4/2017 |
| CN | 108358523 A | 8/2018 |
| CN | 109336444 A | 2/2019 |
| JP | 2002-179451 A | 6/2002 |
| JP | 2003-2726 A | 1/2003 |
| JP | 2003-034562 A | 2/2003 |
| JP | 2014024713 A * | 2/2014 |
| TW | 201733957 A | 10/2017 |
| WO | 99/32541 A1 | 7/1999 |
| WO | 2014/174312 A1 | 10/2014 |
| WO | 2015/139121 A1 | 9/2015 |

OTHER PUBLICATIONS

Liu et al.; "Influence of steel slag-silica fume composite mineral admixture on the properties of concrete"; Powder Technology; 2017; vol. 320; pp. 230-238.
May 26, 2021 Search Report issued in International Patent Application No. PCT/EP2021/056978.
May 26, 2021 Written Opinion issued in International Patent Application No. PCT/EP2021/056978.

\* cited by examiner

*Primary Examiner* — Anthony J Green
(74) *Attorney, Agent, or Firm* — Oliff PLC

(57) ABSTRACT

A method for controlling the volume expansion of a hydraulically setting composition including steel making slag, the method including a step of adding a silica source to the composition. Furthermore, hydraulically setting compositions obtained by such methods and their uses.

18 Claims, No Drawings

METHOD FOR THE CONTROL OF VOLUME EXPANSION OF HYDRAULICALLY SETTING COMPOSITIONS COMPRISING STEEL MAKING SLAG

TECHNICAL FIELD

The present invention belongs to the field of hydraulically setting compositions comprising steel making slag. Specifically, it is an object of the present invention to provide methods for the control of the volume expansion, also called swelling, of hydraulically setting compositions comprising steel making slag. Furthermore, the present invention also provides hydraulically setting compositions obtained by such methods and their uses.

BACKGROUND OF THE INVENTION

Cement-based building materials, especially concrete or mortars, rely on cementitious materials as binders. Cementitious binders typically are hydraulic binders the most abundant of which are cements and especially Ordinary Portland Cement. However, the use of cements and especially of Ordinary Portland Cement has a high environmental footprint. One major reason are the high $CO_2$ emissions associated with the manufacture of cements. Many efforts have thus been made to at least partially replace cements as binders from building materials.

One possibility is the use of materials with cementitious properties, pozzolanes and/or latent hydraulic materials as cement replacement. An especially appealing material of this kind is slag as it is available as a by-product of various metallurgical process, especially steel making, in large quantities.

One specific type of slag is converter slag, also called Basic Oxygen Furnace (BOF) slag. BOF slag is generated during the steel making process when raw iron is oxidized in the converter by oxygen to reduce the carbon content of the raw iron. The use of converter slag as a replacement of cement is, however, limited due to its relatively high content of free lime (CaO). Free lime may react with water to form calcium hydroxide which crystallizes when formed in a cement-base building material upon hardening. This process leads to high crystallization pressure inside the hardened material and subsequently to significant volume expansion or swelling. Nevertheless, several attempts have been made to utilize converter slag in cement-based building materials.

EP 2 989 063 discloses a binder composition comprising 30-60 wt.-% of basic oxygen furnace slag and 30-60 wt.-% of ground granulated blast furnace slag. The problem of swelling is not addressed.

EP 3 119 730 discloses building products which are based on binders comprising steel making slag and a silica rich material. The binders thus obtained harden by a reaction with carbon dioxide. However, the carbonization reaction itself leads to a significant volume increase of the building product. Furthermore, carbonization is a long lasting process or requires specialized industrial equipment which is normally not available at building sites.

TW 2017/33957 discloses a concrete repair material comprising a binder based on blast furnace slag powder, basic oxygen furnace (BOF) slag powder, and cement. The use of BOF slag leads to volume expansion upon hardening which is used to counterbalance the shrinkage caused by the cement.

CN 106587796 discloses a method for stabilizing concrete comprising steel making slag against volume expansion. The method consists of adding an air entraining agent together with pyrogenic silica. However, the introduction of air pores can lead to lower strength of the hardened concrete.

There is thus still a need for new methods for the reduction of the volume expansion of a hydraulically setting compositions comprising steel making slag.

SUMMARY OF THE INVENTION

It is the object of the present invention to provide a method for controlling the volume expansion of a hydraulically setting composition comprising steel making slag which is able to overcome the problems of the prior art.

The present invention therefore relates to a method for controlling the volume expansion of a hydraulically setting composition comprising steel making slag, said method including a step of adding a silica source to said composition.

By the addition of a silica source it is possible to significantly reduce the volume expansion of hydraulically setting composition comprising steel making slag. Hydraulically setting compositions comprising steel making slag and a silica source show volume expansion only to an amount which is acceptable for practical applications. The volume expansion can be further reduced by the additional use of a sulfate source and/or of an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof.

The present invention also provides hydraulically setting compositions which are obtained by a method for controlling the volume expansion of a hydraulically setting composition comprising steel making slag, said method including a step of adding a silica source to said composition. Such hydraulically setting compositions are especially useful as cementitious tile adhesives, grouting materials, self-levelling underlayments, renders, or repair mortars.

WAYS OF CARRYING OUT THE INVENTION

In a first aspect the present invention relates to a method for controlling the volume expansion of a hydraulically setting composition comprising steel making slag, said method including a step of adding a silica source to said composition.

Volume expansion or swelling within the present context refers to an increase in volume of a hydraulically setting composition upon setting, hardening, and/or curing. This increase in volume is typically due to the formation of solid hydrates or hydrate phases that have a higher volume as compared to the materials from which they have been formed. Another explanation for the volume increase lies in the theory of crystallization pressure. The volume expansion (ΔV/V) of a hydraulically setting composition upon setting and hardening can be measured according to a method similar to EN 12617-4 where linear expansion (ΔL/L) is measured in the 3 spatial directions. A control of the volume expansion, within the present context, refers to a reduction of the volume extension to as close to zero as possible. This means that a method for controlling the volume expansion of a hydraulically setting composition is a method of reducing the volume expansion of a given hydraulically setting composition. Any reduction of volume expansion is desirable, a reduction to zero is most preferred. Within the present context the volume expansion is considered to be controlled if it is limited to a level which is acceptable for practical use and especially for durability considerations. The volume expansion is thus considered to be controlled if at least one of the following applies:

(i) the volume expansion (ΔV/V) of a cylinder with a height of 40 mm and a diameter of 40 mm of the hydraulically setting composition is not more than 3.5 Vol.-% after 40 days curing at 35° C./80% r.h, (ii) the linear expansion (ΔL/L) measured according to EN 12617-4 on a prism of 4×4×16 cm of the hydraulically setting composition is lower than 0.2% after curing for 40 days at 45° C./80% r.h., (iii) a prism of 4×4×16 cm prepared according to EN 12617-4 of the hydraulically setting composition shows no significant cracking after curing for 96 days at 70° C./80% r.h.

Within the present context a hydraulically setting composition is a composition which sets and hardens in the presence of water in a hydration reaction to form solid hydrates or hydrate phases. Preferably, the hydrates produced are not water-soluble. In particular, the hydration reactions take place essentially independent of the water content. This means that the hydraulically setting composition can harden and retain its strength even when exposed to water, e.g. underwater or under high humid conditions. A hydraulically setting composition comprises at least one hydraulic binder. A hydraulically setting composition of the present invention is especially a mortar or concrete composition.

A hydraulic binder of the present invention comprises at least one steel making slag. Typically, steel making slag has cementitious properties.

According to certain embodiments, the hydraulic binder consists of at least one steel making slag. According to certain embodiments, the hydraulic binder comprises or consists of at least one steel making slag and additionally further hydraulic binders selected from the group consisting of cements. Suitable cements are especially Portland cement, alumina cement, and/or sulphoaluminate cement. Portland cement can be any cement according to standard EN 197-1. In particular type CEM I, CEM II, CEM III, CEM IV, and/or CEM V, especially CEM I (also called Ordinary Portland Cement—OPC). Portland cements according to other international standards, e.g. ASTM standards or Chinese standards, can be used as well. The term "alumina cement" stands in particular for a cement with an aluminium content, measured as $Al_2O_3$, of at least 30 wt.-%, especially at least 35 wt.-%, in particular 35-58 wt.-%. Preferably, the alumina cement is alumina cement according to standard EN 14647. Preferably, the sulphoaluminate cement is calcium sulphoaluminate cement (CSA). According to certain embodiments, mixtures of Portland cements, alumina cements, and calcium sulphoaluminate cement are used. The weight ratios of Portland cement, alumina cement, and calcium sulphoaluminate cement is not particularly limited and may vary in wide ratios.

The hydraulic binder may additionally comprise pozzolanic materials and/or latent hydraulic materials as long as they are not a silica source as defined below.

Steel making slag within the present context is a by-product from the steelmaking process. Steel making slag is obtained for example in the Thomas process, the Linz-Donawitz process, the Siemens-Martin process or the electric arc furnace when iron is converted to steel. Steel making slag is generated when hot raw iron is treated with oxygen to remove carbon and other elements that have a higher affinity to oxygen than iron. Typically, fluxes and/or elements to fix impurities are added during the process, such as limestone or dolomite. Fluxes and fixing combine with silicates and oxides to form the liquid slag. Liquid slag is then separated from the crude steel and cooled in pits or ground bays to form crystalline or partly crystalline steel making slag. The cooled slag may then be crushed, milled, and sieved to a desired fineness. Preferentially, steel making slag of the present invention is a type of slag which has not been additionally treated in the hot state or during the cooling process. More specifically, steel making slag of the present invention preferentially is not treated with any of fluorspar, $Na_2CO_3$, $NaHCO_3$, $NaOH$, $NaCl_2$, $CaCO_3$, $(NH_4)_2CO_3$, $NH_4HCO_3$ or by a steam treatment.

The content of free lime of a steel making slag can be determined according to NF EN 459-2. According to embodiments, a steel making slag of the present invention can have a low content of free lime. A low content of free lime is an amount of free lime of not more than 5 wt.-%, preferably not more than 4 wt.-%, each based on the total dry weight of the slag. According to further embodiments, a steel making slag of the present invention can have a high content of free lime. A high content of free lime is an amount of free lime of at least 5 wt.-%, preferably at least 7 wt.-%, each based on the total dry weight of the slag. According to certain embodiments, steel making slag with a high content of free lime is preferred. However, it is generally also possible to use steel making slag with a low content of free lime.

The steel making slag is a powder which can be characterized by its particle size. The steel making slag may thus be a powder with low particle size and is then also related to as a fine slag. The steel making slag may also be a powder with high particle size and is then also related to as a coarse slag.

The particle size of fine slag can be determined by laser diffraction as described in ISO 13320:2009. In particular, a Mastersizer 2000 instrument with a Hydro 2000G dispersion unit and the Mastersizer 2000 software from Malvern Instruments GmbH (Germany) is used. Isopropanol, for example, is suitable as the measuring medium. Preferably, a particle size of non-spherical or irregular particles is represented by the equivalent spherical diameter of a sphere of equivalent volume. Throughout this invention, whenever a range of particle sizes is given, these particle sizes are measured by laser diffraction. The lower values of the ranges given for the particle size herein represent D10 values whereas the upper values of the ranges given for the particle size herein represent D90 values of the respective particle size distribution. In other words, the lower values of such ranges correspond to the particle size where only 10% of all particles have a lower particle size, whereas the upper values of such ranges correspond to the particle size where only 10% of all particles have a larger particle size. The average particle size corresponds in particular to the D50 value (50% of the particles are smaller than the given value, 50% are correspondingly bigger).

According to embodiments, a fine steel making slag within the present context has a particle size between 0.5-150 µm, preferably 0.5-100 µm, especially 0.5-70 µm. The steel making slag preferably has a D50 of 5-50 µm, more preferably of 3-30 µm.

The particle size of coarse slag can be analyzed by sieve analysis as described for example in standard ASTM C136/C136M. The process separates fine particles from more course particles by passing the material through a number of sieves of different mesh sizes. The material to be analysed is vibrated through a series of sequentially decreasing sieves using a single, or combination of horizontal, vertical or rotational motion. As a result the percentage of particles passing through a sieve of a given size is given. In the following, an indication of a particle size in percent finer than a given size means that the respective material is constituted to the given percentage of particles which are finer than the given size. Throughout this invention, whenever a percentage of particles finer than a given size is indicated, this percentage is measured by sieve analysis.

According to embodiments, a coarse steel making slag within the present context consists to at least 90 wt.-% of particles finer than 6.5 mm, preferably to at least 90 wt.-% of particles finer than 0.5 mm.

According to one preferred embodiment, the steel making slag of the present invention is a fine slag with a high free lime content. Such a steel making slag has a particle size between 0.5-150 µm, preferably 0.5-100 µm, especially 0.5-70 µm as measured according to ISO 13320:2009 and a content of free lime as determined according to NF EN 459-2 of at least 5 wt.-%, preferably at least 7 wt.-%, each based on the total dry weight of the slag.

According to another preferred embodiment, the steel making slag of the present invention is a fine slag with a low free lime content. Such a steel making slag has a particle size between 0.5-150 µm, preferably 0.5-100 µm, especially 0.5-70 µm as measured according to ISO 13320:2009 and a content of free lime as determined according to NF EN 459-2 of not more than 5 wt.-%, preferably not more than 4 wt.-%, each based on the total dry weight of the slag.

According to another preferred embodiment, the steel making slag of the present invention is a coarse slag with a low free lime content. Such a steel making slag consists to at least 90 wt.-% of particles finer than 6.5 mm, preferably to at least 90 wt.-% of particles finer than 0.5 mm as measured according to ASTM C136/C136M and a content of free lime as determined according to NF EN 459-2 of not more than 5 wt.-%, preferably not more than 4 wt.-%, each based on the total dry weight of the slag.

According to still another preferred embodiment, the steel making slag of the present invention is a coarse slag with a high free lime content. Such a steel making slag consists to at least 90 wt.-% of particles finer than 6.5 mm, preferably to at least 90 wt.-% of particles finer than 0.5 mm as measured according to ASTM C136/C136M and a content of free lime as determined according to NF EN 459-2 of at least 5 wt.-%, preferably at least 7 wt.-%, each based on the total dry weight of the slag.

Another measure for the fineness of a steel making slag is the Blaine surface. The Blaine surface can be determined according to NF EN 196-6. According to a preferred embodiment, the steel making slag has a Blaine surface of between 1,000-4,000 cm$^2$/g. It is, however, also possible to use a steel making slag with a higher specific surface.

A very preferred type of steel making slag within the present context is basic oxygen furnace slag (BOF), also called basic oxygen slag (BOS). The chemical composition of a BOF can be determined by XRF as described in ASTM D5381-93. A typical BOF slag has a chemical composition with 27-60 wt.-% of CaO, 8-38 wt.-% of iron oxides, 7-25 wt.-% of $SiO_2$, 1-15 wt.-% of MgO, 1-8 wt.-% of $Al_2O_3$, 0.5-8 wt.-% of MnO, 0.05-5 wt.-% of $P_2O_5$, and some minor components, especially oxides of Ti, Na, K, and Cr, with <1 wt.-%. The chemical composition of a BOF slag may vary depending on steel plant and depending on operation parameter of the basic oxygen furnace. Especially preferred BOF slag has a chemical composition with 35-55 wt.-% of CaO, 10-30 wt.-% of iron oxides, 10-20 wt.-% of $SiO_2$, 2-10 wt.-% of MgO, 1-5 wt.-% of $Al_2O_3$, 0.5-5 wt.-% of MnO, 0.5-3 wt.-% of $P_2O_5$, and some minor components, especially oxides of Ti, Na, K, and Cr, with <1 wt.-%. A particularly preferred BOF slag comprises 27-60 wt.-% of CaO, 8-38 wt.-% of iron oxides, 7-25 wt.-% of $SiO_2$, 1-15 wt.-% of MgO, 1-8 wt.-% of $Al_2O_3$, 0.5-8 wt.-% of MnO, 0.05-5 wt.-% of $P_2O_5$ and has an $SO_3$ content of <1 wt.-%, preferably <0.5 wt.-%.

It is especially preferred, that the steel making slag does not comprise Dicalciumsilicate (C2S, belite) in an amount of more than 66 wt.-% relative to the total dry weight of the slag.

Within the present context the term "silica source" is used for a material that comprises or essentially consists of silica and/or silicate phases. The silica source is a pozzolanic material. This means that it can react with calcium hydroxide at ordinary temperature to form compounds with cementitious properties. In particular, the silica source is not Portland cement, cement kiln dust or by-pass dust. It is especially preferred, that the silica source does not comprise Dicalciumsilicate (C2S, belite) in an amount of more than 66 wt.-% relative to the total dry weight of the silica source.

According to preferred embodiments, the silica source is selected from the group consisting of ground granulated blast furnace slag (GGBS), fly ash, silica fume, pyrogenic silica, precipitated silica, rice husk ash, volcanic ashes, pumice, zeolites, diatomaceous earth, crushed glass, recycled concrete, calcined clay, especially metakaolin, and mixtures thereof. It is preferred to use only one source of silica. Thereof, GGBS is especially preferred.

According to preferred embodiments, the silica source consists to an extent of at least 20 wt.-%, preferably at least 25 wt.-% of $SiO_2$, relative to the total dry weight of the silica source, as determined by XRF according to ASTM D5381-93.

According to preferred embodiments, the silica source is a powder. It may be characterized by its particle size. Particle sizes can be measured as explained above.

According to embodiments the silica source has a particle size D90 as measured according to ISO 13320:2009 of not more than 200 µm, more of not more than 150 µm, still more preferably of not more than 100 µm, especially of not more than 80 µm. Preferably, the silica source has a D50 as measured according to ISO 13320:2009 of between 0.1-80 µm The silica source of the present invention can further be characterized by its content of amorphous phases. The content of amorphous phases can be determined by XRD analysis according to standard EN 13925. A silica source according to the present invention consists to an extent of at least 50 wt.-% of amorphous phases, based on its total dry weight. It has been found that a higher amount of amorphous phases in the silica source is beneficial in a method of the present invention.

According to embodiments of the present invention, the weight ratio of steel making slag to the silica source can vary in a wide range. The weight ratio of steel making slag to the silica source preferably is higher when a silica source with lower particle size is used.

According to preferred embodiments, a weight ratio of steelmaking slag to silica source is in the range of 1:1-25:1, preferably 2:1-20:1, more preferably 2.5:1-10:1, especially 2.8:1-5:1. The weight ratio always refers to the ratio of the dry weights of the respective materials. A range of weight ratios within the present context is meant to encompass all weight ratios in between the given boundaries and also including the boundaries. That is, a range of 1:1-25:1 is meant to encompass weight ratios of, for example, 1:1, 1.5:1, 2.8:1, 5:1, 10:1, 15:1, 15.5:1, 20:1, 24.9:1, and 25:1. On the other hand, for example, a range of 2.5:1-10:1 is not meant to encompass a weight ratio of 11:1.

According to an especially preferred embodiment, the silica source is selected from ground granulated blast furnace slag (GGBS). In this case a preferred weight ratio of the steel making slag to GGBS is in the range of 1:1-20:1, preferably 2:1-10:1, especially 2.8:1-5:1.

According to another embodiment, the silica source is selected from silica fume. In this case a preferred weight ratio of the of the steel making slag to silica fume is in the range of 1:1-25:1, preferably 1:1-20:1, especially 5:1-20:1.

According to another embodiment, the silica source is selected from calcined clay, especially metakaolin. In this case a preferred weight ratio of the of the steel making slag to calcined clay, especially metakaolin is in the range of 1:1-25:1, preferably 2.5:1-20:1, especially 2.8:1-10:1.

According to another embodiment, the silica source is selected from crushed glass, especially crushed glass dust from glass recycling processes. In this case a preferred weight ratio of the steel making slag to crushed glass is in the range of 1:1-25:1, preferably 2.5:1-20:1, especially 2.8:1-10:1.

According to another embodiment, the silica source is selected from recycled concrete, especially recycled concrete with at least 95 wt.-% of particles finer than 0.2 mm as measured according to ASTM C136/C136M. Such recycled concrete preferably results from washing of fresh concrete mud or from washing of crushed hardened concrete. In this case a preferred weight ratio of the steel making slag the recycled concrete is in the range of 1:1-25:1, preferably 2.5:1-20:1, especially 2.8:1-10:1.

The method of the present invention may additionally comprise a step of adding a sulfate source. A method of the present invention of controlling the volume expansion of a hydraulically setting composition comprising steel making slag, may thus comprise the steps of adding a silica source and of adding a sulfate source to said composition. The order of addition of the silica source and the sulfate source is not important within the present invention. The silica source can be added before the sulfate source. The silica source can also be added after the sulfate source, the silica source can also be added together with the sulfate source, for examples as a pre-mixed blend or as two separate materials. It is also possible, and in certain cases preferred, that the silica source and the sulfate source are added in different process steps. This means, that other process steps, for example addition of other components of the hydraulically setting composition and/or additional mixing steps, can occur in between the steps of adding the silica source and the sulfate source.

Within the present context, a sulfate source is a material with a content of sulfate. It is especially an inorganic salt of sulfate or sulfuric acid. Preferred sulfate sources within the present context are alkali metal salts of sulfuric acid, earth alkali metal salts of sulfuric acids, aluminium sulphate, aluminium hydroxysulfate or alums $(XAl(SO_4)_2 \cdot 12H_2O$ where X is potassium or ammonium). Such sulfates can be present in hydrated form. According to preferred embodiments, the sulfate source is chosen from lithium sulfate, sodium sulfate, potassium sulfate, magnesium sulfate, calcium sulfate, and their mixtures. An especially preferred sulfate source is calcium sulfate.

Calcium sulfate, within the present context, includes anhydrite, gypsum, calcium sulfate hemihydrate in the alpha- and beta-form, calcium sulfate dihydrate, and any mixtures thereof. Calcium sulfate can be based on LGD gypsum, phospho-gypsum, fluoro-gypsum, and natural gypsum.

According to preferred embodiments, the sulfate source is selected from calcium sulfate hemihydrate or anhydrite. Calcium sulfate hemihydrate $(CaSO_4 \cdot 0.5H_2O)$ can be used in the alpha- or on the beta-form. Anhydrite is a mineral consisting of $CaSO_4$ without any water of crystallization.

According to especially preferred embodiments, the sulfate source is a micronized anhydrite.

The sulfate source, within a method of the present invention, may be added to the hydraulically setting composition comprising steel making slag in liquid form or in solid form. The liquid form preferably is a slurry or solution of the respective sulfate source in water. In such cases it is preferred, that the content of sulfate in the slurry or solution is as high as possible, for example >30 wt.-%, preferably >50 wt.-% relative to the total weight of the slurry or solution.

It is, however, preferred, that the sulfate source, especially the calcium sulfate, is added in a method of the present invention in solid form. It is especially preferred to add the sulfate source, especially the calcium sulfate, in powder form. The particle size D50 of the sulfate source, especially of the calcium sulfate, as measured according to ISO 13320: 2009, is below 100 μm, preferably below 60 μm, for example in a range from 5 μm to 50 μm.

According to embodiments, the sulfate source can be added in method of the present invention in a dosage that will result in an amount of between 0.75-8 wt.-% of sulfate, preferably 1.5-5 wt.-% of sulfate, in each case relative to the combined dry weight of the steel making slag and the silica source.

According to an especially preferred embodiment, micronized anhydrite is added to a hydraulically setting composition comprising steel making slag and a silica source with a dosage to result in an amount of 0.75-8 wt.-% of sulfate, preferably 1.5-5 wt.-% of sulfate, in each case relative to the combined dry weight of the steel making slag and the silica source.

The method of the present invention may additionally comprise a step of adding an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof. Of these, lithium carbonate, sodium carbonate, potassium carbonate, sodium bi-carbonate, finely ground calcium carbonate, alkali metal nitrates, alkali metal nitrites, alkali metal salts or earth alkali metal salts of any of citric acid, formic acid, malonic acid, acetic acid, lactic acid, propionic acid, malic acid, or succinic acid, calcium silicate hydrates, glucose, fructose, lactose, mannose, sucrose or sodium gluconate, alkanolamines magnesium chloride, and calcium chloride are preferred. Especially preferred are magnesium chloride, alkali metal nitrates, alkali metal nitrites, potassium or calcium salts of any of citric acid, malonic acid, lactic acid, or malic acid, TEA, TIPA, DEIPA, EDIPA, glucose, fructose, sucrose, sodium gluconate, and mixtures thereof. Hydrates of the above mentioned additives are also encompassed, for example the term magnesium chloride is meant to also encompass magnesium chloride hexahydrate.

A method of the present invention of controlling the volume expansion of a hydraulically setting composition comprising steel making slag, may thus comprise the steps of adding a silica source and of adding an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof to said composition. The order of addition of the silica source and the additive is not important within the present invention. The silica source can be added before the additive. The silica source can also be added after the additive, the silica source can also be added together with the additive, for examples as a pre-mixed blend or as separate materials. It is also possible, and in certain cases preferred, that the silica source and the additive are added in different process steps. This means, that other process steps, for example addition of other components of the hydraulically setting composition and/or additional mixing steps, can occur in between the steps of adding the silica source and the additive.

According to embodiments, the additive essentially consists of only one substance selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), and N,N,N',N'-Tetrahydroxyethyl-ethylenediamine (THEED). In this case it is possible to add the additive in substance. This means that the additive is added as an essentially pure chemical with a purity of >80%, preferably >90%, especially >95%. If added in substance the additive is preferably added in powder form or as a liquid. It is especially preferred, that the additive is added in its physical state at 23° C. and 1023 mbar. It is, however, also possible to add the additive in a preparation also comprising other components. It is for example possible, and in certain cases also preferred to add the additive as a liquid dispersion or solution. If added as a liquid dispersion or solution, it is preferred that it is an aqueous dispersion or solution. It is for example also possible to add the additive in powder form intermixed with or absorbed on an inert carrier. Preferably, the inert carrier is an inorganic material in powder form. A suitable carrier material can be for example calcium carbonate.

According to further embodiments, two or more additives selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED) are added in a method of the present invention. It is then possible to add the two or more additives at the same time, for example as a premix. Of course, this should be avoided when the two or more additives can chemically react. It is therefore also possible to add the two or more additives separately. If added separately, the additives may also be added during different steps of preparing a hydraulically setting composition of the present invention. It is especially preferred, that each additive is added in its physical state at 23° C. and 1023 mbar. It is, however, also possible to add every additive or the premix of additives in a preparation also comprising other components. It is for example possible, and in certain cases also preferred to add certain additives or mixture of additives as a liquid dispersion or solution. If added as a liquid dispersion or solution, it is preferred that it is an aqueous dispersion or solution. It is for example also possible to add certain additives or mixture of additives in powder form intermixed with or absorbed on an inert carrier. Preferably, the inert carrier is an inorganic material in powder form. A suitable carrier material can be for example calcium carbonate.

According to preferred embodiments, the additive is selected from lithium carbonate, sodium carbonate, potassium carbonate, sodium bi-carbonate, finely ground calcium carbonate, alkali metal nitrates, alkali metal nitrites, alkali metal salts or earth alkali metal salts of any of citric acid, formic acid, malonic acid, acetic acid, lactic acid, propionic acid, malic acid, or succinic acid, calcium silicate hydrates, glucose, fructose, lactose, mannose, sucrose, sodium gluconate, alkanolamines, magnesium chloride, calcium chloride, and mixtures thereof.

According to especially preferred embodiments, the additive is selected from magnesium chloride, alkali metal nitrates, alkali metal nitrites, potassium or calcium salts of any of citric acid, malonic acid, lactic acid, or malic acid, TEA, TIPA, DEIPA, EDIPA, glucose, fructose, sucrose, sodium gluconate, and mixtures thereof.

According to embodiments, the additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof is added in a method of the present invention in an amount of 0.05-10 wt.-%, preferably of 0.1-5 wt.-%, in each case relative to the dry weight of steel making slag.

According to especially preferred embodiments, the method of the present invention may in addition to the step of adding a silica source, comprise a step of adding a sulfate source and comprise a step of adding an additive as described above. A method of the present invention of controlling the volume expansion of a hydraulically setting composition comprising steel making slag, may thus comprise the steps of adding a silica source and of adding a sulfate source and of adding an additive as described above. The order of addition of the silica source, and the sulfate source, and the additive is not important within the present invention.

In one embodiment, the method of the present invention consists of a step of adding a silica source and of a step of adding triisopropanolamine to a hydraulically setting composition comprising a steel making slag.

For example, the silica source can be added first, followed by the sulfate source and then followed by the additive. Or the silica source can be added first, followed by the additive and then by the sulfate source. It is also possible to first add the sulfate source, followed by the silica source and then followed by the additive. Or the sulfate source can be added first, followed by the additive and then by the silica source. It is likewise possible to first add the additive, followed by the silica source and then the sulfate source. Or the additive can be added first, followed by the sulfate source and then followed by the silica source.

The silica source can also be added together with the sulfate source and/or the additive, for examples as a premixed blend or as separate materials. It is also possible, and in certain cases preferred, that the silica source, the sulfate source and/or the additive are added in different process steps. This means, that other process steps, for example addition of other components of the hydraulically setting composition and/or additional mixing steps, can occur in between the steps of adding the silica source, the sulfate source and/or and the additive.

In a second aspect the present invention also relates to a hydraulically setting composition comprising steel making slag, wherein the hydraulically setting composition is obtained by a method as described above. Specifically, the method comprises a step of adding a silica source to said hydraulically setting composition comprising steel making slag. The hydraulically setting composition, the steel making slag, and the silica source are as described above. The present invention thus also relates to a hydraulically setting composition, especially a dry mortar, obtained by a method as described above.

The hydraulically setting composition of the present invention may additionally comprise a sulfate source and/or an additive. The sulfate source and the additive are as described above. According to embodiments, the hydraulically setting composition comprises steel making slag and silica source in a weight ratio of:1-25:1, preferably 2:1-20:1, more preferably 2.5:1-10:1, especially 2.8:1-5:1. According to embodiments, the hydraulically setting composition comprises the sulfate source in a dosage that will result in an amount of between 0.75-8 wt.-% of sulfate, preferably 1.5-5 wt.-% of sulfate, in each case relative to the dry weight of the steel making slag. According to embodiments, the hydraulically setting composition comprises the additive in an amount of 0.05-10 wt.-%, preferably of 0.1-5 wt.-%, in each case relative to the dry weight of steel making slag.

According to preferred embodiments a hydraulically setting composition of the present invention comprises (wt.-% are relative to the total dry weight of the composition unless otherwise indicated)

a) 1-90 wt.-%, preferably 5-75 wt.-%, especially 6-20 wt.-% or 25-75 wt.-% of steel making slag, b) a silica source in a dosage that will result in a weight ratio of steel making slag to silica source in the range of 1:1-25:1, preferably 2:1-20:1, more preferably 2.5:1-10:1, especially 2.8:1-5:1, c) optionally a sulfate source in a dosage that will result in an amount of 0.75-8 wt.-% of sulfate, preferably 1.5-5 wt.-% of sulfate, in each case relative to the combined dry weight of the steel making slag and the silica source, d) optionally an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof, in a dosage that will result in an amount of 0.05-10 wt.-%, preferably of 0.1-5 wt.-% of the additive, relative to the dry weight of steel making slag.

According to other embodiments a hydraulically setting composition of the present invention consists of (wt.-% are relative to the total dry weight of the composition unless otherwise indicated)
- a) 1-90 wt.-%, preferably 5-75 wt.-%, especially 6-20 wt.-% or 25-75 wt.-% of steel making slag,
- b) a silica source in a dosage that will result in a weight ratio of steel making slag to silica source in the range of 1:1-25:1, preferably 2:1-20:1, more preferably 2.5:1-10:1, especially 2.8:1-5:1,
- c) optionally a sulfate source in a dosage that will result in an amount of 0.75-8 wt.-% of sulfate, preferably 1.5-5 wt.-% of sulfate, in each case relative to the combined dry weight of the steel making slag and the silica source,
- d) optionally an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof, in a dosage that will result in an amount of 0.05-10 wt.-%, preferably of 0.1-5 wt.-% of the additive, relative to the dry weight of steel making slag.

According to embodiments, the hydraulically setting composition of the present invention is a dry composition with a content of water of less than 5 wt.-%, preferably less than 1 wt.-%, relative to the total weight of the composition. According to some preferred embodiments, the hydraulically setting composition of the present invention is part of a dry composition, preferably a dry mortar or a dry concrete mix, especially a dry mortar. According to other preferred embodiments, the hydraulically setting composition of the present invention is a dry composition, preferably a dry mortar or a dry concrete mix, especially a dry mortar.

The dry composition of the present invention may specifically be used as a binder, part of a binder, a filler or part of the filler system in a dry mortar or dry concrete mix.

Preferably, a hydraulically setting composition of the present invention comprises (wt.-% are relative to the total dry weight of the composition unless otherwise indicated)
- a) 1-90 wt.-%, preferably 5-75 wt.-%, especially 6-20 wt.-% or 25-75 wt.-% of steel making slag,
- b) GGBS in a dosage that will result in a weight ratio of steel making slag to GGBS in the range of 1:1-25:1, preferably 2:1-20:1, more preferably 2.5:1-10:1, especially 2.8:1-5:1,
- c) optionally calcium sulfate in a dosage that will result in an amount of 0.75-8 wt.-% of sulfate, preferably 1.5-5 wt.-% of sulfate, in each case relative to the combined dry weight of the steel making slag and the GGBS,
- d) optionally an additive selected from the group consisting of calcium chloride, and/or alkanolamine in a dosage that will result in an amount of 0.05-10 wt.-%, preferably of 0.1-5 wt.-% of the additive, relative to the dry weight of steel making slag.

Still more preferably, a hydraulically setting composition of the present invention comprises (wt.-% are relative to the total dry weight of the composition unless otherwise indicated)
- a) 1-90 wt.-%, preferably 5-75 wt.-%, especially 6-20 wt.-% or 25-75 wt.-% of steel making slag,
- b) GGBS in a dosage that will result in a weight ratio of steel making slag to GGBS in the range of 1:1-25:1, preferably 2:1-20:1, more preferably 2.5:1-10:1, especially 2.8:1-5:1,
- c) micronized anhydrite in a dosage that will result in an amount of 0.75-8 wt.-% of sulfate, preferably 1.5-5 wt.-% of sulfate, in each case relative to the combined dry weight of the steel making slag and the GGBS,
- d) an additive selected from the group consisting of calcium chloride, and/or alkanolamine in a dosage that will result in an amount of 0.05-5 wt.-%, preferably of 0.1-3.5 wt.-% of the additive, relative to the dry weight of steel making slag.

Especially, a hydraulically setting composition of the present invention comprises (wt.-% are relative to the total dry weight of the composition unless otherwise indicated)
- a) 1-90 wt.-%, preferably 5-75 wt.-%, especially 6-20 wt.-% or 25-75 wt.-% of steel making slag,
- b) GGBS in a dosage that will result in a weight ratio of steel making slag to GGBS in the range of 1:1-25:1, preferably 2:1-20:1, more preferably 2.5:1-10:1, especially 2.8:1-5:1,
- c) micronized anhydrite in a dosage that will result in an amount of 0.75-8 wt.-% of sulfate, preferably 1.5-5 wt.-% of sulfate, in each case relative to the combined dry weight of the steel making slag and the GGBS,
- d) an additive selected from the group consisting of calcium chloride, triethanolamine (TEA) and/or triisopropanolamine (TIPA) in a dosage that will result in an amount of 0.05-5 wt.-%, preferably of 0.1-3.5 wt.-% of the additive, relative to the dry weight of steel making slag.

A hydraulically setting composition of the present invention may also comprise (wt.-% are relative to the total dry weight of the composition unless otherwise indicated)
- a) 1-90 wt.-%, preferably 5-75 wt.-%, especially 6-20 wt.-% or 25-75 wt.-% of steel making slag,
- b) GGBS in a dosage that will result in a weight ratio of steel making slag to GGBS in the range of 1:1-25:1, preferably 2:1-20:1, more preferably 2.5:1-10:1, especially 2.8:1-5:1,
- c) triisopropanolamine (TIPA) in a dosage that will result in an amount of 0.05-5 wt.-%, preferably of 0.1-3.5 wt.-% of TIPA, relative to the dry weight of steel making slag.

A hydraulically setting composition of the present invention may further comprises aggregates. Aggregates can be any material that is non-reactive in the hydration reaction of hydraulic binders. Aggregates can be any aggregate typically used for hydraulically setting compositions. Typical aggregates are for example rock, crushed stone, gravel, slag, sand, especially quartz sand, river sand and/or manufactured sand, recycled concrete, glass, expanded glass, hollow glass beads, glass ceramics, volcanic rock, pumice, perlite, vermiculite, quarry wastes, raw, fired or fused earth or clay, porcelain, electrofused or sintered abrasives, firing support, silica xerogels, and/or fine aggregates such as ground limestone, ground dolomite, and/or ground aluminum oxide.

Aggregates useful for the present invention can have any shape and size typically encountered for such aggregates. An especially preferred aggregate is sand. Sand is a naturally occurring granular material composed of finely divided rock or mineral particles. It is available in various forms and sizes. Examples of suitable sands are quartz sand, limestone sand, river sand or crushed aggregates. Suitable sands are for example described in standards ASTM C778 or EN 196-1. According to embodiments, at least part of the sand used for a hydraulically setting composition of the present invention is quartz sand, river sand, manufactured sand, for example from granite or limestone, or mixtures thereof. According to a preferred embodiment, river sand is used for a hydraulically setting composition of the present invention, since it is chemically inert, strong, available in various sizes and the workability of the composition can be set advantageously. Commonly, sand is supplied in different fractions of particles passing through a sieve with clear openings. According to embodiments, sand with 99% particles having a size of 1 mm or lower, preferably of 0.8 mm or lower, especially of 0.6 mm or lower, in each case as measured according to ASTM C136/136M, is used for a hydraulically setting composition of the present invention. Larger particles may lead to improper mixing.

According to embodiments, aggregates can also be one or more of the following (i)-(v):

(i) biosourced materials, preferably of plant origin, more preferably biosourced materials of plant origin essentially composed of cellulose and/or lignin, especially biosourced materials selected from the group comprising or consisting of hemp, flax, cereal straw, oats, rice, rape, maize, sorghum, flax, miscanthus, rice husk, sugar cane, sunflower, kenaf, coconut, olive stones, bamboo, wood, or mixtures thereof. According to embodiments, biosourced materials of plant origin have a defined form which is preferably selected from fibres, fibrils, dust, powders, shavings, pith, in particular pith of sunflower, maize, rape, and mixtures thereof.

(ii) synthetic non-mineral materials, preferably selected from the group comprising or consisting of thermoplastic, thermosetting plastics, elastomers, rubbers, textiles fibers, plastic materials reinforced with glass or carbon fibres. Synthetic non-mineral materials can be filled or unfilled.

(iii) aggregates of inorganic nature from the deconstruction of civil engineering or building structures, preferably selected from the group comprising or consisting of waste concrete, mortar, bricks, natural stone, asphalt, tiles, tiling, aerated concrete, clinker, scrap metal.

(iv) aggregates of organic nature from the recycling of industrial products, in particular composite materials which are difficult to recycle, especially recycled insulating materials. Especially preferred examples are polystyrenes, polyurethanes, phenolic resins, wood insulating materials, and mixtures thereof.

(v) non-hazardous granular materials usually destined for landfill such as used foundry sands, catalyst supports, Bayer process de-soding treatment supports, clinker aggregates, fillers from the treatment of excavation sludge, sewage sludge, slurry, paper waste, paper incineration ashes, household waste incineration ashes.

Most preferably, aggregates are in particulate form.

According to embodiments, aggregate within the present context may also comprise at least one steel making slag, especially basic oxygen furnace slag (BOF).

According to embodiments, a hydraulically setting composition of the present invention comprises from 35-85 wt.-%, preferably 50-80 wt.-%, especially 60-75 wt.-%, each based on the total dry weight of the composition, of sand.

A hydraulically setting composition may advantageously further comprise further materials common in the mortar and/or concrete industry such as for example fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibres, dedusting agents, blowing agents, pigments, corrosion inhibitors, biocides, chromium(VI) reducers. It can be advantageous to combine two or more of the mentioned further materials in one hydraulically setting composition.

According to embodiments, a hydraulically setting composition of the present invention comprises at least one superplasticizer selected from the group consisting of lignosulfonates, sulfonated vinylcopolymers, polynaphthalene sulfonates, sulfonated melamine formaldehyde condensates, polyethylene oxide phosphonates, polycarboxylate ethers (PCE), or mixtures thereof. Preferably, a hydraulically setting composition of the present invention comprises a PCE. Such PCE are particularly well suited to allow good processability of the hydraulically setting composition even at low water content.

According to embodiments, a hydraulically setting composition of the present invention comprises at least one thickener selected from the group consisting of starch, pectin, amylopectin, modified starch, cellulose, modified cellulose, such as carboxymethylcellulose, hydroxymethylcellulose, hydroxyethylcellulose, methylhydroxyethylcellulose, casein, xanthan gum, diutan gum, welan gum, galactomannanes, such as guar gum, tara gum, fenugreek gum, locust bean gum or cassia gum, alginates, tragacanth gum, dextran, polydextrose, layered silicates such as sepiolite, bentonite or vermiculite, and mixtures thereof.

According to embodiments, a hydraulically setting composition of the present invention comprises at least one retarder selected from the group consisting of sugar acids, sugars, sugar alcohols, hydroxycarboxylic acids or their salts, phosphates, phosphonates, borates and amines. Preferably, the retarder is chosen from the group consisting of gluconic acid, citric acid, tartric acid or their respective sodium salts.

According to embodiments, a hydraulically setting composition of the present invention comprises at least one redispersible polymer powder. The term redispersible polymer powder refers to a powder which contains a polymer and after introduction into water forms a stable dispersion. A redispersible polymer powder encompasses not only the polymer but typically also mixtures thereof with e.g. protective colloids, emulsifiers, and support materials.

Redispersible polymer powders can be manufactured for example by spray drying of polymer dispersions as for example described in patent application EP1042391. Suitable redispersible powders are for example available from Wacker Chemie AG under the trade name Vinnapas. The use of redispersible powders of synthetic organic polymers is preferred for the context of the present invention. A synthetic organic polymer within the context of the present invention can be produced by radical polymerization of monomers selected form the group consisting of ethylene, propylene, butylene, isoprene, butadiene, styrene, acrylonitrile, acrylic acid, methacrylic acid, esters of acrylic acid, esters of methacrylic acid, vinylesters, vinylchloride. It is preferred that synthetic polymers are copolymers synthesized from two or more, preferably two, different monomers. The sequence of the copolymer can be alternating, blocked or random. Preferred synthetic organic polymers are copolymers of vinylacetate and ethylene, vinylacetate and ethylene and methylmethacrylate, vinylacetate and ethylene and vinylester, vinylacetate and ethylene and acrylic acid ester, vinylchloride and ethylene and vinyllaureate, vinylacetate and vinylveratate, acrylic ester and styrene, acrylic ester and styrene and butadiene, acrylic ester and acrylonitrile, styrene and butadiene, acrylic acid and styrene, methacrylic acid and styrene, styrene and acrylic acid ester, styrene and methacrylic acid ester. The glass transition temperature (Tg) of said synthetic organic polymers can vary in a wide range. Tg of suitable synthetic organic polymers can be for example between −50° C. and +60° C., preferably between −45° C. and +35° C., more preferred between −25° C. and +15° C.

According to certain embodiments a hydraulically setting composition of the present invention comprises cements as described above in addition to the steel making slag and the silica source and optionally further components. An especially preferred cement is CEM I according to EN 197-1 (Ordinary Portland Cement—OPC).

According to embodiments a hydraulically setting composition of the present invention comprises According to preferred embodiments a hydraulically setting composition of the present invention comprises
 a) 1-90 weight parts, preferably 5-75 weight parts, especially 6-20 weight parts or 25-75 weight parts of steel making slag,
 b) a silica source in a dosage that will result in a weight ratio of steel making slag to silica source is in the range of 1:1-25:1, preferably 2:1-20:1, more preferably 2.5:1-10:1, especially 2.8:1-5:1,
 c) optionally a sulfate source in a dosage that will result in an amount of 0.75-8 wt.-% of sulfate, preferably 1.5-5 wt.-% of sulfate, in each case relative to the combined dry weight of the steel making slag and the silica source,
 d) optionally an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof, in in a dosage that will result in an amount of 0.05-10 wt.-%, preferably of 0.1-5 wt.-% of the additive, relative to the dry weight of steel making slag,
 e) optionally 1-20 weight parts, preferably 7-16 weight parts of cement, preferably of Ordinary Portland Cement,
 f) optionally 35-85 weight parts, preferably 50-80 weight parts, especially 60-75 weight parts of sand.

According to other embodiments a hydraulically setting composition of the present invention consists of
 a) 1-90 weight parts, preferably 5-75 weight parts, especially 6-20 weight parts or 25-75 weight parts of steel making slag,
 b) a silica source in a dosage that will result in a weight ratio of steel making slag to silica source is in the range of 1:1-25:1, preferably 2:1-20:1, more preferably 2.5:1-10:1, especially 2.8:1-5:1,
 c) optionally a sulfate source in a dosage that will result in an amount of 0.75-8 wt.-% of sulfate, preferably 1.5-5 wt.-% of sulfate, in each case relative to the combined dry weight of the steel making slag and the silica source,
 d) optionally an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof in a dosage that will result in an amount of 0.05-10 wt.-%, preferably of 0.1-5 wt.-% of the additive, relative to the dry weight of steel making slag,
 e) optionally 1-20 weight parts, preferably 7-16 weight parts of cement, preferably of Ordinary Portland Cement,
 f) optionally 35-85 weight parts, preferably 50-80 weight parts, especially 60-75 weight parts of sand,
 g) optionally further materials selected from the group of fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibres, dedusting agents, blowing agents, pigments, corrosion inhibitors, biocides, chromium(VI) reducers.

According to still other embodiments a hydraulically setting composition of the present invention consists of
 a) 6-20 weight parts of basic oxygen furnace slag (BOF),
 b) a silica source, preferably GGBS, in a dosage that will result in a weight ratio of steel making slag to silica source in the range of 2:1-20:1, more preferably 2.5:1-10:1, especially 2.8:1-5:1,
 c) optionally a sulfate source in a dosage that will result in an amount of 0.75-8 wt.-% of sulfate, preferably 1.5-5 wt.-% of sulfate, in each case relative to the combined dry weight of the steel making slag and the GGBS,
 d) optionally an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof in a dosage that will result in an amount of 0.05-10 wt.-%, preferably of 0.1-5 wt.-% of the additive, relative to the dry weight of steel making slag,
- e) optionally 1-20 weight parts, preferably 7-16 weight parts of cement, preferably of Ordinary Portland Cement,
- f) 35-85 weight parts, preferably 50-80 weight parts, especially 60-75 weight parts of sand,
- g) optionally further materials selected from the group of fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibres, dedusting agents, blowing agents, pigments, corrosion inhibitors, biocides, chromium(VI) reducers.

According to still other embodiments a hydraulically setting composition of the present invention consists of
- a) 6-20 weight parts of basic oxygen furnace slag (BOF),
- b) a silica source, preferably GGBS, in a dosage that will result in a weight ratio of steel making slag to silica source in the range of 2.8:1-5:1,
- c) optionally a sulfate source in a dosage that will result in an amount of 0.75-8 wt.-% of sulfate, preferably 1.5-5 wt.-% of sulfate, in each case relative to the combined dry weight of the steel making slag and the GGBS,
- d) an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof in a dosage that will result in an amount of 0.05-10 wt.-%, preferably of 0.1-5 wt.-% of the additive, relative to the dry weight of steel making slag,
- e) 7-16 weight parts of Ordinary Portland Cement,
- f) 60-75 weight parts of sand,
- g) optionally further materials selected from the group of fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibres, dedusting agents, blowing agents, pigments, corrosion inhibitors, biocides, chromium(VI) reducers.

According to still other embodiments a hydraulically setting composition of the present invention consists of
- a) 25-75 weight parts of basic oxygen furnace slag (BOF),
- b) a silica source, preferably GGBS, in a dosage that will result in a weight ratio of steel making slag to silica source in the range of 2:1-20:1, more preferably 2.5:1-10:1, especially 2.8:1-5:1,
- c) optionally a sulfate source in a dosage that will result in an amount of 0.75-8 wt.-% of sulfate, preferably 1.5-5 wt.-% of sulfate, in each case relative to the combined dry weight of the steel making slag and the GGBS,
- d) optionally an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof in a dosage that will result in an amount of 0.05-10 wt.-%, preferably of 0.1-5 wt.-% of the additive, relative to the dry weight of steel making slag,
- e) optionally 1-20 weight parts, preferably 7-16 weight parts of cement, preferably of Ordinary Portland Cement,
- f) 35-85 weight parts, preferably 50-80 weight parts, especially 60-75 weight parts of sand,
- g) optionally further materials selected from the group of fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibres, dedusting agents, blowing agents, pigments, corrosion inhibitors, biocides, chromium(VI) reducers.

According to still other embodiments a hydraulically setting composition of the present invention consists of
- a) 25-75 weight parts of basic oxygen furnace slag (BOF),
- b) a silica source, preferably GGBS, in a dosage that will result in a weight ratio of steel making slag to silica source in the range of 2:1-20:1, more preferably 2.5:1-10:1, especially 2.8:1-5:1,
- c) optionally a sulfate source in a dosage that will result in an amount of 0.75-8 wt.-% of sulfate, preferably 1.5-5 wt.-% of sulfate, in each case relative to the combined dry weight of the steel making slag and the GGBS,
d) an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bicarbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, especially potassium or calcium salts thereof, alkali metal silicates, calcium silicate hydrates, sugars or sugar acids, especially glucose, fructose, lactose, mannose, sucrose or sodium gluconate, alkanolamines, especially dimethylaminoethanol, diethylaminoethanol, N-methyldiethanolamine, triethanolamine (TEA), triisopropanolamine (TIPA), Diethanol-isopropanolamine (DEIPA), Ethanol-diisopropanolamine (EDIPA), N,N,N',N'-Tetrahydroxyethyl-ethylenediamine (THEED), and mixtures thereof in a dosage that will result in an amount of 0.05-10 wt.-%, preferably of 0.1-5 wt.-% of the additive, relative to the dry weight of steel making slag,
e) optionally 7-16 weight parts of Ordinary Portland Cement,
f) 35-85 weight parts of sand,
g) optionally further materials selected from the group of fillers, plasticizers and/or superplasticizers, air entrainers, defoamers, stabilizers, rheology modifiers, especially thickeners, water reducers, redispersible polymer powders, accelerators, retarders, water resisting agents, strength enhancing additives, fibres, dedusting agents, blowing agents, pigments, corrosion inhibitors, biocides, chromium(VI) reducers.

Preferably, a hydraulically setting composition of the present invention comprises
a) 1-90 weight parts, preferably 5-75 weight parts, especially 6-20 weight parts or 25-75 weight parts of steel making slag,
b) GGBS in a dosage that will result in a weight ratio of steel making slag to GGBS in the range of 1:1-25:1, preferably 2:1-20:1, more preferably 2.5:1-10:1, especially 2.8:1-5:1,
c) optionally a sulfate source in a dosage that will result in an amount of 0.75-8 wt.-% of sulfate, preferably 1.5-5 wt.-% of sulfate, in each case relative to the combined dry weight of the steel making slag and the GGBS,
d) optionally an additive selected from the group consisting of calcium chloride, and/or alkanolamine, in a dosage that will result in an amount of 0.05-5 wt.-%, preferably of 0.1-3.5 wt.-% of the additive, relative to the dry weight of steel making slag,
e) optionally 1-20 weight parts, preferably 7-16 weight parts of cement, preferably of Ordinary Portland Cement,
f) optionally 35-85 weight parts, preferably 50-80 weight parts, especially 60-75 weight parts of sand.

Still more preferably, a hydraulically setting composition of the present invention comprises
a) 1-90 weight parts, preferably 5-75 weight parts, especially 6-20 weight parts or 25-75 weight parts of steel making slag,
b) GGBS in a dosage that will result in a weight ratio of steel making slag to GGBS in the range of 1:1-25:1, preferably 2:1-20:1, more preferably 2.5:1-10:1, especially 2.8:1-5:1,
c) micronized anhydrite in a dosage that will result in an amount of 0.75-8 wt.-% of sulfate, preferably 1.5-5 wt.-% of sulfate, in each case relative to the combined dry weight of the steel making slag and the GGBS,
d) an additive selected from the group consisting of calcium chloride, and/or alkanolamine, in a dosage that will result in an amount of 0.05-5 wt.-%, preferably of 0.1-3.5 wt.-% of the additive, relative to the dry weight of steel making slag,
e) optionally 1-20 weight parts, preferably 7-16 weight parts of cement, preferably of Ordinary Portland Cement,
f) optionally 35-85 weight parts, preferably 50-80 weight parts, especially 60-75 weight parts of sand.

Especially, a hydraulically setting composition of the present invention comprises
a) 1-90 weight parts, preferably 5-75 weight parts, especially 6-20 weight parts or 25-75 weight parts of steel making slag,
b) GGBS in a dosage that will result in a weight ratio of steel making slag to GGBS in the range of 1:1-25:1, preferably 2:1-20:1, more preferably 2.5:1-10:1, especially 2.8:1-5:1,
c) micronized anhydrite in a dosage that will result in an amount of 0.75-8 wt.-% of sulfate, preferably 1.5-5 wt.-% of sulfate, in each case relative to the combined dry weight of the steel making slag and the GGBS,
d) an additive selected from the group consisting of calcium chloride, triethanolamine (TEA) and/or triisopropanolamine (TIPA), in a dosage that will result in an amount of 0.05-5 wt.-%, preferably of 0.1-3.5 wt.-% of the additive, relative to the dry weight of steel making slag,
e) 1-20 weight parts, preferably 7-16 weight parts of cement, preferably of Ordinary Portland Cement,
f) 35-85 weight parts, preferably 50-80 weight parts, especially 60-75 weight parts of sand.

According to certain embodiments, a hydraulically setting composition of the present invention can be made by mixing the constituents, especially the steel making slag and the silica source and optionally the sulfate source and/or the additive, and optionally the aggregate and/or any further materials, as defined above by conventional means. Suitable mixers are for example horizontal single shaft mixers, twin shaft paddle mixers, vertical shaft mixers, ribbon blenders, orbiting mixers, change-can mixers, tumbling vessels, vertical agitated chambers or air agitated operations. Mixing can be continuous or batch-wise.

According to a preferred embodiment, the hydraulically setting composition of the present invention is a one-component mixture. That means that all the individual constituents are intermixed. One-component compositions are in particular easy to handle and exclude the risk of a mix up or wrong dosing of individual constituents by users.

However, it is in principle possible to provide the hydraulically setting composition of the present invention as a two-component or even a multi-component composition. Two- or multi-component compositions allow e.g. for adjusting the hydraulically setting composition with regard to specific applications.

In a further aspect, the present invention also relates to a hydraulically setting composition as described above, characterized in that it further comprises water in a water/powder weight ratio between 0.1-0.6, preferably 0.2-0.5, especially 0.2-0.35. The term powder relates to the dry hydraulically setting composition as described above.

Water can be any water available such as distilled water, purified water, tap water, mineral water, spring water, and well water. The use of waste water is possible only in cases where the composition of such waste water is known and where none of the impurities contained may impart the functionality of any other component of the composition of the present invention. The use of salt water is not preferred due to its high content of chlorides and the risk of corrosion of steel reinforcement associated therewith.

Typically, a dry hydraulically setting composition is mixed with water only very shortly before its application. This is because upon contact with water, a dry hydraulically setting composition of the present invention will start to harden. It is thus especially preferred to first make a dry hydraulically setting composition, especially a dry mortar or dry concrete, as described above and then mix this dry hydraulically setting composition with water at or near the place of application.

Methods and devices for mixing of the dry hydraulically setting composition with water are not particular limited and are known to the person skilled in the art. Mixing can be continuous, semi-continuous or batch-wise. Continuous mixing offers the advantage of a high material throughput.

A hydraulically setting composition comprising water is also related to as a wet composition.

According to embodiments a dry composition as described above is especially part of a dry mortar, a ready mix mortar, or dry concrete composition. According to further embodiments, a dry composition as described above is especially in the form of a dry mortar, a ready mix mortar, or a dry concrete composition. A dry mortar, ready mix mortar, or dry concrete composition within the present context can be in the form of a monocomponent material. It is, however, also possible for a dry composition within the present context to be in the form of a multicomponent material, for example a two component or a three component material. According to still further embodiments, a dry composition as described above is prepared on a job site, for example by intermixing at least one of the constituents with other constituents of the dry composition and/or by intermixing two or more components of a multicomponent material.

In yet another aspect, the present invention relates to the use of a hydraulically setting composition as described above as a cementitious tile adhesive, a grouting material, a self-levelling underlayment, a self-levelling overlayment, a render, a repair mortar, a masonry thin join mortar or concrete, a screed, a wall leveller for interior or exterior use, a non-shrink grout, a thin joint mortar, a waterproofing mortar, or an anchoring mortar.

A cementitious tile adhesive is especially according to standard EN 12004-1. A grouting material is especially according to standard EN 13888. A self-levelling underlayment or a self-levelling overlayment is especially according to standard EN 13813. A render is especially according to standard EN 998-1. A repair mortar is especially according to standard EN 1504-3. A masonry mortar or concrete is especially according to standards EN 998-2 and EN 206-1. A screed is especially according to standard EN 13813. A non-shrink grout is especially according to standard EN 1504-6. A thin joint mortar is especially according to standard EN 998-2. A waterproofing mortar is especially according to standard EN 1504-2. An anchoring mortar is especially according to standard EN 1504-6.

According to one preferred embodiment, a hydraulically setting composition of the present invention is thus used as a part of or as a cementitious tile adhesive. According to another preferred embodiment, a hydraulically setting composition of the present invention is thus used as a part of or as a masonry mortar or concrete. According to another preferred embodiment, a hydraulically setting composition of the present invention is thus used as a part of or as a screed. According to another preferred embodiment, a hydraulically setting composition of the present invention is thus used as a part of or as a self-levelling underlayment or self-levelling overlayment.

Typically, the uses relate to a wet composition, that is a hydraulically setting composition also comprising water in a water/powder ratio between 0.1-0.6, preferably 0.2-0.5, especially 0.2-0.35. The weight ratio of water to powder is adjusted to control the rheology of the wet composition. A higher amount of water will lead to a more flowable wet composition and a lower amount of water to a pasty wet composition. The rheology may be adjusted by the amount of water in a way to yield a wet composition with a rheology ranging from self-levelling to very thick.

It is possible to apply the wet composition of the present invention by any means known to the person skilled in the art. According to one embodiment, the wet composition is applied by trowel, brush or roller. According to another embodiment, the wet composition is applied in a spray application. According to yet another embodiment, the wet composition is poured from a suitable receptacle.

Spray applications have the advantage that the application can be done very quickly and in a continuous manner. Suitable equipment for such spray applications is known to the person skilled in the art. According to an especially preferred embodiment, a process of the present invention is run in a continuous manner. Such process is characterized in that water and a dry hydraulically setting composition are mixed continuously and are supplied to a spray head in a continuous manner. This allows for a continuous spray application.

A wet composition of the present invention can be applied in a single layer or in multiple layers. Application in multiple layers has the advantage that a higher overall layer thickness can be achieved.

A primer can be applied to the substrate before application of a wet composition of the present invention. It is also possible to apply a primer in between different layers of a wet composition of the present invention during a multiple layer application.

Upon mixing with water, a hydraulically setting composition of the present invention will start to set and harden. The setting and hardening of a wet composition of the present invention proceeds with time and physical properties, e.g. compressive strength, tensile adhesion strength, etc. are developed thereby. A wet composition of the present invention will harden at various temperatures. It is, however, preferred to harden wet composition of the present invention at temperatures between +4° C. and +50° C., preferably between +5° C. and +35° C. It is highly preferred to harden a wet composition of the present invention at a pressure of appr. 1023 mbar. It is also possible to harden and cure a wet composition of the present invention at higher temperatures and also under elevated pressure, for example in an autoclave. Hardening and curing is typically finished after 28 days. However, especially depending on temperature, pressure, and humidity, hardening and curing may already be finished after less than 28 days or last longer than 28 days.

In still another aspect the present invention relates to the hardened bodies resulting from hardening and curing a hydraulically setting composition of the present invention. The present invention especially relates to a hardened cementitious tile adhesive, a hardened grouting material, a hardened self-levelling underlayment, a hardened self-levelling overlayment, a hardened render, a hardened repair mortar, a hardened masonry thin join mortar or concrete, a hardened screed, a hardened wall leveller, a hardened non-shrink grout, a hardened thin joint mortar, a hardened waterproofing mortar, or a hardened anchoring mortar, whereby any of the cementitious tile adhesive, grouting material, self-levelling underlayment, self-levelling overlayment, render, repair mortar, masonry thin join mortar or concrete, screed, wall leveller, non-shrink grout, thin joint mortar, waterproofing mortar, or anchoring mortar comprises or consists of a hydraulically setting composition obtained by a method of the present invention.

The following examples will provide the person skilled in the art with further embodiments of the present invention. They are not meant to limit the invention in any way.

cylinders with a diameter of 40 mm and a height of 40 mm in all three spatial directions was measured and the volume expansion $\Delta V/V$ in Vol-% was calculated therefrom.

Linear expansion was measured according to EN 12617-4. After a curing time under conditions as indicated in below tables 2-5, the volume expansion of prisms of the size 4×4×16 cm only in their long direction was measured and the linear expansion $\Delta L/L$ in Vol-% was calculated therefrom.

Compressive strength was measured after a hardening time and under conditions as indicated in below tables 3 and 4. Measurements were performed according to EN 196-1: 2016 on prisms of 40×40×160 mm.

Initial tensile adhesion strength after hardening time as indicated in table 5, tensile adhesion strength after 30 min open time, tensile adhesion strength after water immersion, tensile adhesion strength after heat ageing, tensile adhesion strength after freeze-thaw cycle, and slip were measured in accordance with EN 12004-2:2017.

Appearance of cracks was determined visually on the surface of test prisms of size 40×40×160 mm after the time indicated. Bleeding and separation was also determined visually after casting of test specimen.

EXAMPLES

TABLE 1

Chemicals used

| Name | Description |
|---|---|
| BOF slag 1 | Particle size (D10 to D90 according ISO 13320: 2009) = 3.5-82 μm, D50 = 22 μm; free lime: 8.5 wt.-% |
| BOF slag 2 | Particle size (according ASTM C136/C136M): 90 wt.-% finer than 0.5 mm; free lime: 8.5 wt.-% |
| BOF slag 3 | Particle size (D10 to D90 according ISO 13320: 2009) = 1.5-50 μm, D50 = 12.5 μm; free lime: 8.5 wt.-% |
| BOF slag 4 | Particle size (according ASTM C136/C136M): 50 wt.-% finer than 0.5 mm, 98 wt.-% finer than 4 mm; free lime: 8.5 wt.-% |
| BOF slag 5 | Particle size (according ASTM C136/C136M): 50 wt.-% finer than 0.5 mm, 98 wt.-% finer than 4 mm; free lime: 3.5 wt.-% |
| SF 1 | Silica fume, 99 wt.-% $SiO_2$, D90 = 0.9 μm, 99 wt.-% amorphous phases |
| SF 2 | Silica fume, 80 wt.-% $SiO_2$, D90 = 59 μm, 90 wt.-% amorphous phases |
| Fly Ash | 46 wt.-% $SiO_2$, D90 = 86 μm, 52 wt.-% amorphous phases |
| GGBS | Ground granulated blastfurnace slag, 37 wt.-% $SiO_2$, D90 = 35 μm, 98 wt.-% amorphous phases |
| Metakaolin | Calcined clay, 52 wt.-% $SiO_2$, D50 = 5 μm, D90 = 90 μm 70 wt.-% amorphous phases |
| DCF | Crushed glass dust, 74 wt.-% $SiO_2$, D90 = 113 μm, 99 wt.-% amorphous phases |
| Sand | CEN standard sand according to EN 196-1 |
| CEM I 42.5 R | Ordinary Portland Cement according to EN 197-1 |
| $CaCl_2$ | Anhydrous, >93% purity |
| $MgCl_2$ | $MgCl_2$ hexahydrate, >98% purity |
| NaCl | >99% purity |
| TIPA | Triisopropylamine (CAS 3424-21-3), >95% purity |
| TEA | Triethanolamine (CAS 102-71-6), >95% purity |
| Anhydrite | Anhydrous $CaSO_4$, $SO_3$ content > 50%; D90 < 40μ |
| Calcium formate | CAS 544-17-2, >99% purity |
| Rheology modifier | modified starch ether (Opagel CMT) |
| Further material mix | Mixture of thickeners (modified starch ether: Opagel CMT, cellulose ether: Walocel MW 40'000 PFV), rheology modifier (Starvis 3040F), redispersible polymer powder (Axilat PAV 30), and superplasticizer (polycarboxylate ether: Melflux 4930F) |

Test Methods:

Volume expansion was measured according to a method similar to EN 12617-4. After a curing time under conditions as indicated in below tables 2-5, the volume expansion of Example 1

Example 1 shows the effect of various silica sources to control the volume expansion of BOF slag upon hardening.

The following table 2 shows reference examples 1 to 5 which are not according to the present invention as well as examples 1-1 to 1-16 which are according to the present invention.

The compositions of the respective mixes are given in table 1. All numbers refer to wt.-%. BOF slag, silica source, and further materials were weighed in the respective amounts and mixed in a mixing bowl on a Hobart mixer for 3 min at 20° C./50% r.h. A visually homogeneous dry mix was obtained. Water was added to this dry mix in an amount to yield a weight ratio of water to powder (w/p ratio) as indicated in table 2. Mixing was then continued for another 3 min. Measurements were performed as indicated above.

Results of volume expansion are reported in table 2.

TABLE 2

Variation of silica source

|  | Ref-1 | 1-1 | 1-2 | 1-3 | 1-4 | 1-5 | 1-6 |
|---|---|---|---|---|---|---|---|
| BOF slag 1 | 99.73 | 89.73 | 74.73 | 89.73 | 74.73 | 89.73 | 74.73 |
| SF 1 |  | 10 | 25 |  |  |  |  |
| Fly Ash |  |  |  | 10 | 25 |  |  |
| metakaolin |  |  |  |  |  | 10 | 25 |
| Further material mix | 0.27 | 0.27 | 0.27 | 0.27 | 0.27 | 0.27 | 0.27 |
| w/p ratio | 0.24 | 0.24 | 0.24 | 0.24 | 0.24 | 0.24 | 0.24 |
| Volume expansion after 40 days @ 35° C., 80% r.h. [Vol-%] | 7.7 | 2.1 | 1.5 | 2.1 | 1.6 | 2.2 | 1.6 |

|  | Ref-2 | 1-7 | 1-8 | 1-9 | 1-10 | 1-11 | 1-12 |
|---|---|---|---|---|---|---|---|
| BOF slag 1 | 96.53 | 89.73 | 74.73 | 49.87 | 83.13 | 89.73 | 74.73 |
| GGBS | 3.2 | 10 | 25 | 49.86 | 16.6 |  |  |
| DCF |  |  |  |  |  | 10 | 25 |
| Further material mix | 0.27 | 0.27 | 0.27 | 0.27 | 0.27 | 0.27 | 0.27 |
| w/p ratio | 0.24 | 0.24 | 0.24 | 0.24 | 0.24 | 0.24 | 0.24 |
| Volume expansion after 40 days @ 35° C., 80% r.h. [Vol-%] | 6.2 | 3.1 | 2.9 | 2.8 | 3 | 3.2 | 3 |

|  | Ref-3 | 1-13 | 1-14 | Ref-4 | Ref-5 | 1-15 | 1-16 |
|---|---|---|---|---|---|---|---|
| BOF slag 1 | 97.77 | 90.66 | 73.49 | 33.24 | 94.64 | 87.74 | 71.13 |
| GGBS | 1.96 | 9.07 | 26.24 | 66.49 | 1.89 | 8.78 | 25.40 |
| CaCl$_2$ |  |  |  |  | 3.20 | 3.20 | 3.20 |
| Rheology modifier | 0.27 | 0.27 | 0.27 | 0.27 | 0.27 | 0.27 | 0.27 |
| w/p ratio | 0.24 | 0.24 | 0.24 | 0.35 | 0.24 | 0.24 | 0.24 |
| Cracking after 28 days @ 23° C./50% r.h. | yes | no | no | yes | yes | no | no |
| Bleeding, sedimentation | no | no | no | yes | no | no | no |
| Compressive strength after 28 days @ 23° C./50% r.h. [MPa] | 0.2 | 2.1 | 3.5 | n.m. | 0.2 | 4.6 | 10.3 |
| Volume expansion after 40 days @ 35° C., 80% r.h. [Vol-%] | 7.3 | 3.1 | 2.9 | n.m. | 5.7 | 3.1 | 2.9 | n.m.: not measured

It can be seen from the above table 2 that the addition of a silica source to BOF slag significantly reduces the volume expansion and is thus a suited to control the volume expansion.

It can be further seen from table 2 that at a weight ratio of steel making slag to silica source of 30:1 (Ref-2), 50:1 (Ref-3) as well as of 1:2 (Ref-4) the control of volume expansion does not work properly. For reference example 4 the amount of water had to be increased in comparison to other examples to obtain a workable mixture.

Example 2

Example 2 shows that different types of BOF slag can be used with GGBS as a silica source to control the volume expansion. Furthermore, example 2 shows the effectiveness of adding a sulfate source or of additives to control the volume expansion of BOF slag based materials.

The following table 3 shows reference examples 6 and 7 which are not according to the present invention as well as examples 2-1 to 2-8 which are according to the present invention.

The compositions of the respective mixes are given in table 3. All numbers refer to wt.-%. BOF slag, GGBS, sand, anhydrite CaCl$_2$, and TIPA were weighed in the respective amounts and mixed in a mixing bowl on a Hobart mixer for 3 min at 20° C./50% r.h. A visually homogeneous dry mix was obtained. Water was added to this dry mix in an amount to yield a weight ratio of water to powder (w/p ratio) as indicated in table 3. Mixing was then continued for another 3 min. Measurements were performed as indicated above and results are reported in table 3.

TABLE 3

Variation of BOF slag and use of additives

|  | Ref-6 | Ref-7 | 2-1 | 2-2 | 2-3 | 2-4 | 2-5 | 2-6 | 2-7 | 2-8 |
|---|---|---|---|---|---|---|---|---|---|---|
| BOF slag 2 | 25 |  | 18.5 |  | 18.5 |  | 18.5 |  | 18.5 |  |
| BOF slag 3 |  | 25 |  | 18.5 |  | 18.5 |  | 18.5 |  | 18.5 |

TABLE 3-continued

Variation of BOF slag and use of additives

|  | Ref-6 | Ref-7 | 2-1 | 2-2 | 2-3 | 2-4 | 2-5 | 2-6 | 2-7 | 2-8 |
|---|---|---|---|---|---|---|---|---|---|---|
| GGBS |  |  | 6.5 | 6.5 | 6.5 | 6.5 | 6.5 | 6.5 | 6.5 | 6.5 |
| Sand | 75 | 75 | 75 | 75 | 74.25 | 74.25 | 74.88 | 74.88 | 74.25 | 74.25 |
| $CaCl_2$ |  |  |  |  | 0.75 | 0.75 |  |  |  |  |
| TIPA |  |  |  |  |  |  | 0.12 | 0.12 |  |  |
| Anhydrite |  |  |  |  |  |  |  |  | 0.75 | 0.75 |
| w/p ratio | 0.125 | 0.125 | 0.125 | 0.125 | 0.125 | 0.125 | 0.125 | 0.125 | 0.125 | 0.125 |
| Compressive strength after 2 days @ 20° C., 50% r.h. [MPa] | 0 | 0 | 0.4 | 1.1 | 1.5 | 4.2 | 2.1 | 5.3 | 0.8 | 1.5 |
| Compressive strength after 28 days @ 20° C., 50% r.h. [MPa] | 0 | 2.0 | 8.5 | 12.8 | 13.5 | 25.8 | 14.6 | 29.7 | 12.6 | 17.8 |
| Linear expansion after 40 days @ 45° C., 80% r.h. [%] | 0.98 | 0.81 | 0.14 | 0.09 | 0.03 | 0.02 | 0.02 | 0.01 | 0.07 | 0.04 |

It can be seen from the above table 3 that the addition of GGBS is suitable to reduce the linear expansion of materials based on different types of BOF slag. At the same time addition of GGBS increases the mechanical strength. The addition of anhydrite as sulfate source, CaCl2 or TIPA does lead to a further reduction of the linear volume expansion and also to a further increase of mechanical strength.

Example 3

Example 3 shows the effectiveness of additionally adding a sulfate source or to control the volume expansion of BOF slag based materials.

The following table 4 shows reference examples 8 and 9 which are not according to the present invention as well as examples 3-1 to 3-7 which are according to the present invention.

The compositions of the respective mixes are given in table 4. All numbers refer to wt.-%. BOF slag, GGBS, anhydrite, and the respective additive were weighed in the respective amounts and mixed in a mixing bowl on a Hobart mixer for 3 min at 20° C./50% r.h. A visually homogeneous dry mix was obtained. Water was added to this dry mix in an amount to yield a weight ratio of water to powder (w/p ratio) as indicated in table 4. Mixing was then continued for another 3 min. Measurements were performed as indicated above and results are reported in table 4.

It can be seen from the above table 4 that the use of anhydrite as a sulfate source, $CaCl_2$, $MgCl_2$, NaCl, TIPA or TEA in addition to the silica source is suitable to reduce the volume expansion of materials based on BOF slag. The reduction is higher than with GGBS alone. At the same time the mechanical strength is increased when any of anhydrite as a sulfate source, $CaCl_2$, $MgCl_2$, NaCl, TIPA or TEA is used in addition to the silica source. The use of an additive alone is not sufficient to control the volume expansion as is shown for TIPA (compare examples Ref-9 and 3-5).

Example 4

Example 4 shows that materials according to the present invention fulfil the requirements of EN 12004-1 and can thus be used as cementitious tile adhesives.

The following table 5 shows examples 4-1 to 4-6 which are according to the present invention.

The compositions of the respective mixes are given in table 5. All numbers refer to wt.-%. BOF slag, CEM I, silica source, anhydrite, sand, calcium formate, additive, and further materials were weighed in the respective amounts and mixed in a mixing bowl on a Hobart mixer for 3 min at 20° C./50% r.h. A visually homogeneous dry mix was obtained. Water was added to this dry mix in an amount to yield a weight ratio of water to powder (w/p ratio) as indicated in table 5. Mixing was then continued for another 1 min, then

TABLE 4 effect of sulfate source and of additives

|  | Ref-8 | 3-1 | Ref-9 | 3-2 | 3-3 | 3-4 | 3-5 | 3-6 | 3-7 |
|---|---|---|---|---|---|---|---|---|---|
| BOF slag 1 | 99.73 | 74.49 | 99.61 | 71.13 | 71.0 | 71.47 | 73.4 | 73.4 | 71.13 |
| GGBS |  | 26.24 |  | 25.40 | 25.36 | 25.52 | 26.1 | 26.21 | 25.4 |
| $CaCl_2$ |  |  |  | 3.2 |  |  |  |  |  |
| NaCl |  |  |  |  | 3.26 |  |  |  |  |
| $MgCl_2$ |  |  |  |  |  | 2.74 |  |  |  |
| TIPA |  |  | 0.12 |  |  |  | 0.12 |  |  |
| TEA |  |  |  |  |  |  |  | 0.12 |  |
| Anhydrite |  |  |  |  |  |  |  |  | 3.2 |
| Rheology modifier | 0.27 | 0.27 | 0.27 | 0.27 | 0.27 | 0.27 | 0.27 | 0.27 | 0.27 |
| w/p ratio | 0.24 | 0.24 | 0.24 | 0.24 | 0.24 | 0.24 | 0.24 | 0.24 | 0.24 |
| Compressive strength after 2 days @ 20° C., 50% r.h. [MPa] | 0 | 0 | 1.5 | 4.1 | 0 | 0 | 6.0 | 6 | 3.5 |
| Compressive strength after 5 days @ 20° C., 50% r.h. [MPa] | 0 | 0 | 4.2 | 29.9 | 0.2 | 9 | 35.6 | 34.5 | 25.6 |
| Compressive strength after 9 days @ 20° C., 50% r.h. [MPa] | 0 | 0.2 | 8.1 | 35.3 | 11.5 | 27.0 | 42.1 | 41.9 | 32.4 |
| Volume expansion after 40 days @ 35° C., 80% r.h. [Vol-%] | 7.7 | 2.9 | 4.8 | 0.4 | 1.5 | 0.9 | 0.3 | 0.3 | 0.4 | stopped for scrapping the wall of the mixing bowl, and finally continued for another 1 minute. Measurements were performed as indicated above and results are reported in table 5.

Two different fractions of silica sand were used for the experiments presented in table 5. Silica sand 1 is a coarse grinded sand with a particle size (according ASTM C136/C136M) as follows: 50% finer than 0.5 mm, 98% finer than

TABLE 5

BOF slag based cementitious tile adhesives

|  | 4-1 | 4-2 | 4-3 | 4-4 | 4-5 | 4-6 |
|---|---|---|---|---|---|---|
| BOF slag 2 | 9 | 13 |  | 7.9 | 10.3 | 9.8 |
| BOF slag 3 |  |  | 13 |  |  |  |
| CEM I 42.5 R | 8 |  |  | 16.2 | 16.2 | 16.2 |
| GGBS | 8 | 12 | 12 | 2.9 |  |  |
| SF 1 |  |  |  |  | 0.5 |  |
| Metakaolin |  |  |  |  |  | 1.0 |
| Anhydrite | 0.51 | 0.75 | 0.75 |  |  |  |
| Sand | 71.79 | 72.03 | 72.03 | 70.3 | 70.3 | 70.3 |
| Calcium formate | 0.6 |  |  | 0.6 | 0.6 | 0.6 |
| NaCl | 0.8 |  |  |  |  |  |
| TIPA |  | 0.12 | 0.12 |  |  |  |
| CaCl$_2$ |  | 0.8 | 0.8 |  |  |  |
| Further material mix | 1.3 | 1.3 | 1.3 | 2.1 | 2.1 | 2.1 |
| w/p ratio | 0.208 | 0.198 | 0.198 | 0.21 | 0.21 | 0.21 |
| Initial tensile adhesion strength after 24 hours | 0.23 | 0.15 | 0.22 | n.m. | n.m. | n.m. |
| Initial tensile adhesion strength after 7 days [MPa] | 0.87 | 0.65 | 0.79 | 1.09 | 1.12 | 1.19 |
| Initial tensile adhesion strength after 28 days [MPa] | 1.21 | 1.05 | 1.17 | 1.32 | 1.17 | 1.22 |
| Tensile adhesion strength @ 30 min open time after 24 hours [MPa] | 0.26 | 0.15 | 0.17 | n.m. | n.m. | n.m. |
| Tensile adhesion strength @ 30 min open time after 7 days [MPa] | 0.67 | 0.48 | 0.34 | 1.03 | 0.92 | 0.95 |
| Tensile adhesion strength @ 30 min open time after 28 days [MPa] | 0.83 | 0.75 | 0.74 | 1.08 | 1.08 | 1.12 |
| Tensile adhesion strength after water immersion [MPa] | 1.26 | 1.24 | 1.29 | 1.21 | 1.16 | 1.08 |
| Tensile adhesion strength after heat ageing [MPa] | 1.11 | 1.02 | 1.08 | 1.24 | 1.09 | 1.12 |
| Tensile adhesion strength after freeze-thaw cycles [MPa] | 1.18 | 1.04 | 1.14 | 1.25 | 1.11 | 1.12 |
| Slip [mm] | <0.5 | <0.5 | <0.5 | <0.5 | <0.5 | <0.5 |
| Linear expansion after 40 days @ 35° C., 80% r.h. [Vol.-%] | <0.1 | <0.1 | <0.1 | <0.1 | <0.1 | <0.1 | n.m.: not measured

It can be seen from the above table 5, that a hydraulically setting composition prepared by a method of the present invention is able to fulfil the requirements for cementitious tile adhesives as set out in standard EN 12004-1. This is possible for materials comprising ordinary Portland Cement and for materials which are free of Ordinary Portland Cement.

Example 5

Example 5 shows the effect of a variation of the particle size of BOF slag.

The following table 6 shows examples 5-1 to 5-3 which are according to the present invention.

The compositions of the respective mixes are given in table 6. All numbers refer to wt.-%. BOF slag, sand, CEM I, silica source, and further materials were weighed in the respective amounts and mixed in a mixing bowl on a Hobart mixer for 3 min at 20° C./50% r.h. A visually homogeneous dry mix was obtained. Water was added to this dry mix in an amount to yield a weight ratio of water to powder (w/p ratio) as indicated in table 6. Mixing was then continued for another 3 min. Measurements were performed as indicated above and results are indicated in table 6.

4 mm. Silica sand 2 is a medium grinded sand with a particle size (according ASTM C136/C136M) as follows: 90% finer than 0.5 mm. By combining such sand fractions in the respective mixes, the overall particle size distribution of the total mix and thus its and compacity is kept at the same level. This permits to compare the effect of the particle size of the BOF slag.

TABLE 6

BOF with different particle size

|  | 5-1 | 5-2 | 5-3 |
|---|---|---|---|
| BOF slag 4 | 39.2 |  |  |
| BOF slag 5 |  | 39.2 |  |
| BOF slag 2 |  |  | 39.2 |
| CEM I 42.5 R | 7.3 | 7.3 | 7.3 |
| GGBS | 14 | 14 | 14 |
| Silica sand 1 |  |  | 39.2 |
| Silica sand 2 | 39.2 | 39.2 |  |
| Further material mix | 0.3 | 0.3 | 0.3 |
| w/p ratio | 0.15 | 0.15 | 0.15 |
| Linear expansion after 7 days @ 70° C., 80% r.h. [Vol.-%] | 0.15 | 0.12 | 0.12 |

TABLE 6-continued

BOF with different particle size

| | 5-1 | 5-2 | 5-3 |
|---|---|---|---|
| Linear expansion after 28 days @ 70° C., 80% r.h. [Vol.-%] | 0.28 | 0.16 | 0.13 |
| Linear expansion after 96 days @ 70° C., 80% r.h. [Vol.-%] | n.m. | 0.2 | 0.15 |
| Sample appearance after 96 days @ 70° C., 80% r.h. | destroyed | thin cracks | free of cracks | n.m.: not measured

It can be seen from the above table 6 that BOF slag 2 with its characteristic particle size and free lime content can be controlled regarding volume expansion and thus cracking by adding GGBS as silica source in a weight ratio of BOF slag:GGBS of 2.8:1.

It can be further seen from the above table 6 that volume expansion of a hydraulically setting composition using BOF slag of coarser particle size (BOF slag 4 and 5) can still be controlled by addition of GGBS as silica source. However, the control over longer periods of time is only efficiently possible with the coarser BOF slag if the free lime content is low (examples 5-1 vs 5-2).

The invention claimed is:

1. A method for controlling the volume expansion of a hydraulically setting composition comprising steel making slag, said method including
   a step of adding a silica source to said composition; and
   a step of adding 0.05-10 wt.-%, relative to the weight of steel making slag, of an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of any of citric acid, formic acid, malonic acid, acetic acid, propionic acid, malic acid, or succinic acid, alkali metal silicates, calcium silicate hydrates, sugars or sugar acids, alkanolamines, and mixtures thereof.

2. The method according to claim 1, wherein the steel making slag has a free lime content as determined according to NF EN 459-2 of not more than 5 wt.-% based on the total dry weight of the slag.

3. The method according to claim 1, wherein the steel making slag has a free lime content as determined according to NF EN 459-2 of at least 5 wt.-% based on the total dry weight of the slag.

4. The method according to claim 1, wherein the steel making slag consists to at least 90 wt.-% of particles finer than 6.5 mm as measured according to ASTM C136/C136M or wherein the steel making slag has a particle size between 0.5-150 μm as measured according to ISO 13320:2009.

5. The method according to claim 1, wherein the silica source consists to an extent of at least 20 wt.-% of $SiO_2$, relative to the total dry weight of the silica source, as determined by XRF according to ASTM D5381-93.

6. The method according to claim 1, wherein the silica source consists to an extent of at least 50 wt.-% of amorphous phases, based on its total dry weight.

7. The method of claim 1, wherein the silica source is selected from the group consisting of ground granulated blast furnace slag (GGBS), fly ash, silica fume, pyrogenic silica, precipitated silica, rice husk ash, volcanic ashes, pumice, zeolites, diatomaceous earth, crushed glass, recycled concrete, calcined clay, and mixtures thereof.

8. The method of claim 1, wherein a weight ratio of steel making slag to silica source is in the range of 1:1-25:1.

9. The method according to claim 1, wherein it additionally comprises a step of adding a sulfate source.

10. The method according to claim 9, wherein the sulfate source is selected from calcium sulfate hemihydrate or anhydrite.

11. The method according to claim 9, wherein the sulfate source is added in a dosage that will result in an amount of between 0.75-8 wt.-% of sulfate, relative to the combined dry weight of the steel making slag and the silica source.

12. The method according to claim 1, wherein the steel making slag is a basic oxygen furnace slag.

13. A hydraulically setting composition obtained by a method of claim 1.

14. The hydraulically setting composition according to claim 13, wherein it comprises (wt.-% are relative to the total dry weight of the composition)
   (a) 1-90 wt.-% of steel making slag,
   (b) a silica source in a dosage that will result in a weight ratio of steel making slag to silica source in the range of 1:1-25:1,
   (c) optionally a sulfate source in a dosage that will result in an amount of 0.75-8 wt.-% of sulfate, relative to the combined dry weight of the steel making slag and the silica source,
   (d) 0.05-10 wt.-%, relative to the weight of steel making slag, of an additive selected from the group consisting of sodium chloride, potassium chloride, magnesium chloride, calcium chloride, lithium hydroxide, lithium carbonate, sodium hydroxide, potassium hydroxide, sodium carbonate, potassium carbonate, sodium bi-carbonate, finely ground calcium carbonate, alkali metal nitrates, alkali metal nitrites, alkali metal thiocyanates, alkali metal salts or earth alkali metal salts of citric acid, formic acid, malonic acid, acetic acid, propionic acid, malic acid, or succinic acid, alkali metal silicates, calcium silicate hydrates, sugars or sugar acids, alkanolamines, and mixtures thereof.

15. The hydraulically setting composition according to claim 13, wherein it is a dry composition with a content of water of less than 5 wt.-%, relative to the total weight of the composition.

16. The hydraulically setting composition according to claim 13, further comprising water in a water/powder weight ratio between 0.1-0.6.

17. A cementitious tile adhesive, a grouting material, a self-levelling underlayment, a self-levelling overlayment, a render, a repair mortar, a masonry thin join mortar or concrete, a screed, a wall leveller for interior or exterior use, a non-shrink grout, a thin joint mortar, a waterproofing mortar, or an anchoring mortar, comprising the hydraulically setting composition according to claim 16.

18. A hardened body obtained by hardening a hydraulically setting composition according to claim 16.

* * * * *